E. S. BACON.
Bee Hive.

No. 29,753.

Patented Aug. 28, 1860.

Witnesses
W. Fersch
C. W. Hughes

Inventor
E. S. Bacon
per Munn & Co.
attorneys

UNITED STATES PATENT OFFICE.

E. S. BACON, OF ALBION, NEW YORK.

BEEHIVE.

Specification of Letters Patent No. 29,753, dated August 28, 1860.

*To all whom it may concern:*

Be it known that I, E. S. BACON, of Albion, in the county of Orleans and State of New York, have invented a new and Improved Beehive; and I do hereby declare that the following is a full, clear, and exact description of the same, reference being had to the annexed drawings, making a part of this specification, in which—

Figure 1:
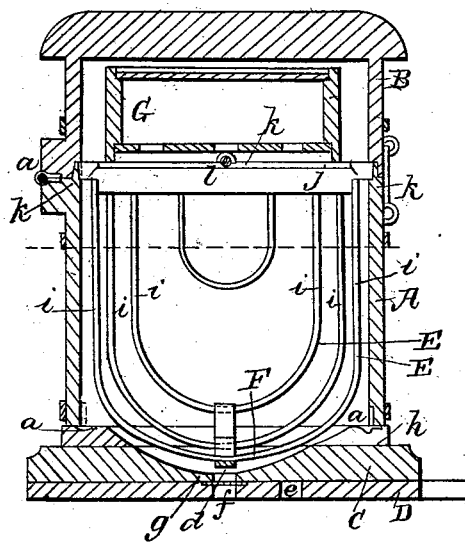
Figure 2:
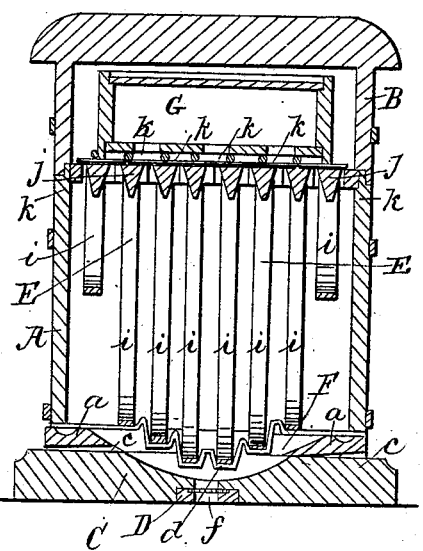
Figure 3:
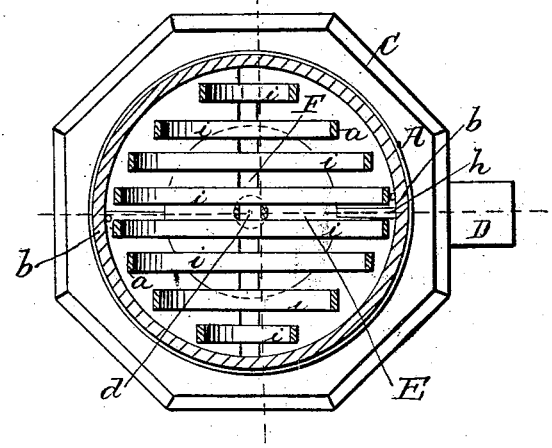
Figure 4:
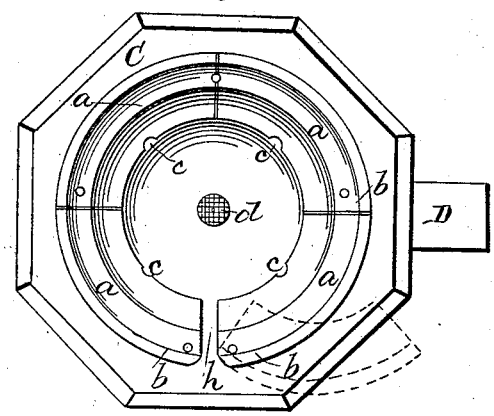

Figures 1 and 2 are central sectional elevations of my invention the two planes of section crossing each other at right angles; Fig. 3 a horizontal section of the same, taken in the line $x, x$, Fig. 1; Fig. 4 a detached plan view of the vane of the same.

Similar letters of reference indicate corresponding parts in the several figures.

The object of this invention is to obtain a hive that will admit of the bees remaining in a compact state within the hive and still have access to all parts thereof without materially spreading themselves or becoming detached from a general mass. Bees as is well known keep themselves warm in winter by assembling together in a close mass or body the animal heat keeping the hive at a sufficiently high temperature. They also keep in pretty close contact to defend themselves and property (honey) against the attack of the moth. The ordinary square bee-hives do not admit of the bees acting according as their instinct dictates as the angles of the hive are more remote from its center than the other parts and the bees in feeding are obliged to separate at times thereby reducing the temperature of the hive and rendering themselves less competent to resist the depredation of intruders.

This invention obviates these difficulties and at the same time has all the advantages attending the use of movable frames and spare honey boxes—the latter named parts as well as the hive being constructed in a novel way and provided with moth traps as hereinafter fully described, whereby it is believed that a hive possessing several advantages over those heretofore used are obtained.

To enable those skilled in the art to fully understand and construct my invention I will proceed to describe it.

The body or main portion A, of the hive I construct of staves and of cylindrical form, the upper part B, being similarly constructed and connected to the lower part by a hinge $a$, and fitted to it like the lid of an ordinary box. The lower end of the body A, of the hive is open, and it rests on flanches $a$, on a base C, the upper surface of which is concave as shown in Figs. 1, and 2.

The flanches $a$, are segments secured at one end to the base C, by pivots $b$, so that the flanches may be moved outward as shown in red in Fig. 4. The inner parts of the flanches are made concave corresponding to the concave of the base. The under side of the flanches $a$, are grooved as shown at $c$, and form moth traps the eggs and worms being accessible by turning out the flanches after removing the body A, of the hive.

The base C, of the hive has an opening $d$, at its center, and a slide D, which is dovetailed in the under side of the base said slide being provided with two openings $e, f$, one of which is covered with wire cloth $g$. The entrance $h$, to the body A, of the hive is formed between the ends of two flanches $a, a$.

Within the body A, of the hive there are suspended a series of comb frames E. These frames E, are formed of bows $i$, which may be of any suitable wood bent in proper form with their ends fitted in slats $j$, the ends of which rest on a shoulder $k$, at the upper part of the body A. The slats $j$, may be of V form in their transverse section as shown in Fig. 2, sufficient spaces being allowed between the slats for the bees to pass through. The bows $i$, varying in size of course to correspond to the form of the body A, and consequently they consecutively diminish in width from the central bow in the hive outward each way. The bows also diminish in height from the central one outward each way so that they will conform to the concave in the base C. The varying dimensions of the bars $i$, are shown clearly in Figs. 1, 2, and 3. The slats $j$, of course gradually decrease in length from the central one outward both ways. The lower end of the bows $i$, are kept in a proper relative position with each other by a corrugated bar F, which is attached to the bottom of the body A, and has the lower ends of the bows $i$, fitted in recesses in the bar formed by its corrugations as shown clearly in Fig. 2. In the upper surface of each slat $j$, there is driven a staple $k$. These staples when the slats are in proper place are in line with each other and a rod $l$, is passed through them as shown clearly in Figs. 1, and 2. This arrangement of the rod and staples admits of all the comb-frames being simultaneously drawn from the hive when desired.

On the slats $j$, the spare-honey box G, is placed. This may be arranged in the usual or any proper way.

From the above description it will be seen that in consequence of the hive being of cylindrical form and provided with comb-frames as described the bees will be allowed to keep in a compact mass as all parts of the honey will be equidistant from the center of the hive, that is to say in a horizontal plane. The hive therefore may be kept at a uniform temperature and the bees also permitted to defend themselves against the intrusion of the moth and other depredators. The arrangement of the flanches $a$, also form a very ready means for destroying the eggs and worms.

I do not claim the perforated slide D, for ventilating purposes nor do I claim the spare-honey box G, for these have been previously used; but I do claim as new and desire to secure by Letters Patent—

1. A bee-hive constructed of cylindrical form, when provided with comb-frames E, constructed substantially as shown to conform to the interior of the hive for the purpose specified.

2. The flanches $a$, when grooved at their under sides and attached to the base C, as and for the purpose specified.

E. S. BACON.

Witnesses:
A. F. R. BRALEY,
H. LAUERY.